(12) United States Patent
Combest

(10) Patent No.: US 6,415,886 B1
(45) Date of Patent: *Jul. 9, 2002

(54) IN-WALL SPEAKER MOUNTING APPARATUS

(75) Inventor: Christopher E. Combest, Leawood, KS (US)

(73) Assignee: Multi Service Corporation, Overland Park, KS (US)

(*) Notice: Subject to any disclaimer, the term of this patent is extended or adjusted under 35 U.S.C. 154(b) by 0 days.

This patent is subject to a terminal disclaimer.

(21) Appl. No.: 09/963,832

(22) Filed: Sep. 26, 2001

Related U.S. Application Data

(63) Continuation of application No. 09/515,810, filed on Feb. 29, 2000.

(51) Int. Cl.[7] .............................. A47F 5/08; H05K 5/00; G12B 9/00
(52) U.S. Cl. .................. 181/150; 248/27.1; 248/188.4; 248/231.9; 411/384; 312/242
(58) Field of Search ............................... 248/27.1, 200, 248/200.1, 217.4, 231.9, 231.91, 906; 181/150, 199; 381/180, 386; 455/350; 403/187, 188, 283, 408.1; 411/383, 384, 395, 535, 536, 546; 312/242, 245

(56) References Cited

U.S. PATENT DOCUMENTS

| | | | | |
|---|---|---|---|---|
| 1,288,024 A | * | 12/1918 | Kendig ........................ 220/3.9 |
| 2,899,220 A | * | 8/1959 | Abrams ....................... 248/27.1 |
| 2,915,266 A | * | 12/1959 | Antonucci .................... 248/27.1 |
| 3,580,988 A | * | 5/1971 | Orlowski et al. .............. 16/2.2 |
| 3,669,393 A | * | 6/1972 | Paine et al. ................. 248/188.4 |
| D244,877 S | * | 6/1977 | McLaughlin ................. D14/171 |
| 4,108,407 A | * | 8/1978 | Cable et al. .............. 248/188.4 |
| 4,296,280 A | * | 10/1981 | Richie ......................... 181/150 |
| 4,640,381 A | * | 2/1987 | Tsuchiya et al. ............ 181/144 |
| 4,699,437 A | * | 10/1987 | Genereaux ................... 220/480 |
| D307,761 S | * | 5/1990 | Ryan ............................. D17/1 |
| 5,082,083 A | * | 1/1992 | Draffen ...................... 181/150 |
| 5,292,092 A | * | 3/1994 | Curtis et al. ................ 248/27.1 |
| 5,299,766 A | * | 4/1994 | Curtis et al. ................ 248/27.1 |
| 5,310,149 A | * | 5/1994 | Struthers et al. ............ 181/150 |
| 5,330,144 A | * | 7/1994 | Stevenson et al. ........ 248/231.9 |
| 5,388,795 A | * | 2/1995 | Struthers et al. ............ 181/150 |
| 5,400,412 A | * | 3/1995 | King et al. .................. 181/150 |
| 5,423,500 A | * | 6/1995 | Struthers et al. ............ 181/150 |
| 5,525,001 A | * | 6/1996 | Perkins ........................ 403/157 |
| 6,125,881 A | * | 10/2000 | Hobbs et al. ................ 137/360 |

FOREIGN PATENT DOCUMENTS

| | | | |
|---|---|---|---|
| JP | 59215195 B | * | 12/1984 |
| JP | 60200697 B | * | 10/1985 |

* cited by examiner

Primary Examiner—Leslie A. Braun
Assistant Examiner—Jon Szumny
(74) Attorney, Agent, or Firm—Hovey Williams LLP

(57) ABSTRACT

An apparatus for mounting an audio speaker within a wall such that the apparatus and speaker are attached to and supported by one or more wall studs and so that a face of the audio speaker is substantially flush with the wall. The apparatus broadly comprises a substantially rectangular box having a backwall and four upstanding sidewalls. One or more of the sidewalls is provided with an aperture, and inside the aperture is located a fixture assembly. The fixture assembly comprises a spacer mount through which is threaded a spacer having a bore. The spacer is threadably extendable and retractable, and can be extended to a length sufficient to contact the nearest wall stud. A fixture is then inserted into and through the bore in the spacer and is driven or screwed into the wall stud to as to secure the apparatus and speaker in position.

16 Claims, 2 Drawing Sheets

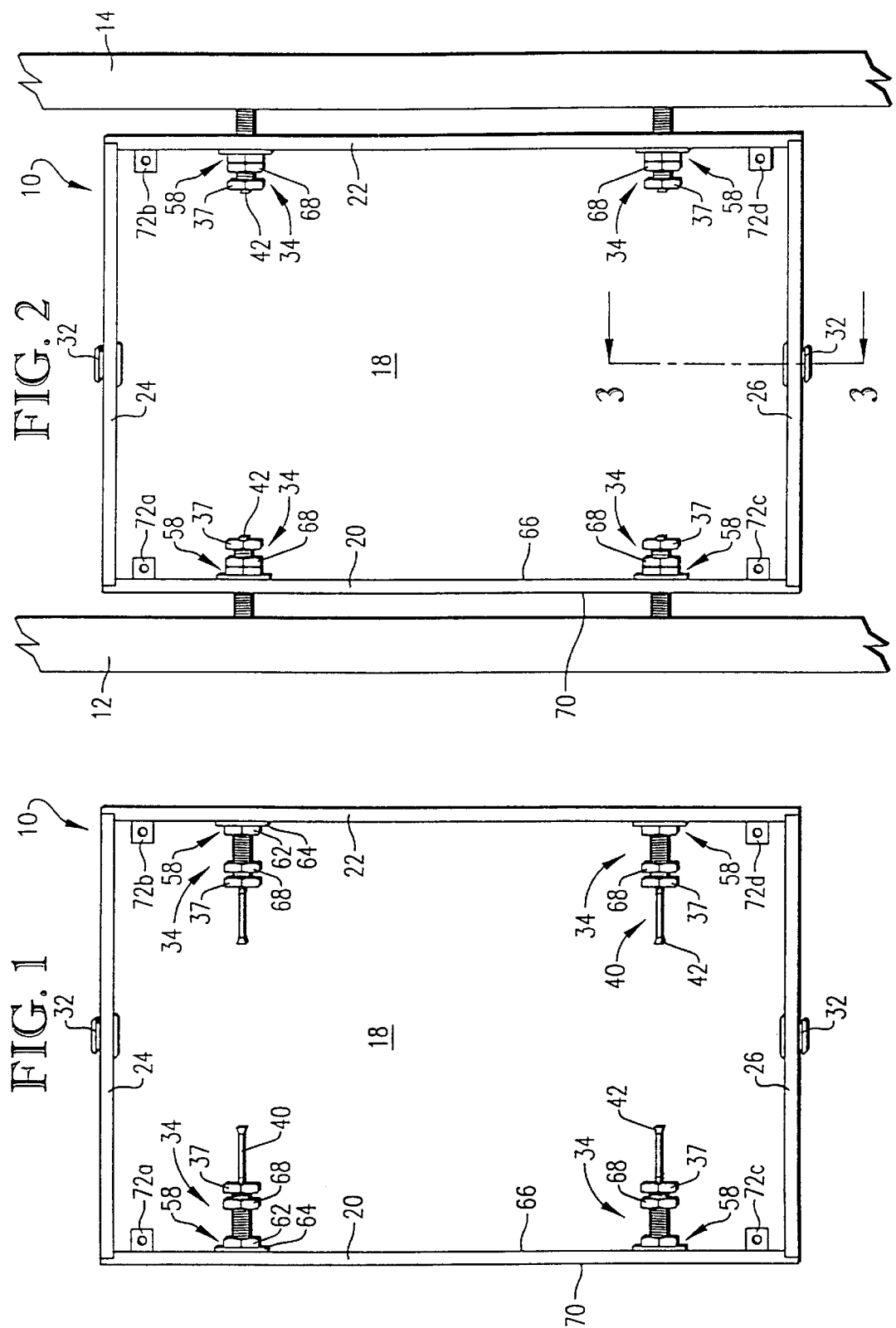

IN-WALL SPEAKER MOUNTING APPARATUS

RELATED APPLICATIONS

This application is a continuation of application Ser. No. 09/515,810, filed Feb. 29, 2000.

BACKGROUND OF THE INVENTION

1. Field of the Invention

The present invention relates to apparatuses used to mount audio speakers to and in walls. More particularly, the invention relates to apparatuses used to mount audio speakers in walls such that the face of the speaker is flush with the face of the wall. Still more particularly, the present invention relates to apparatuses which mount audio speakers in walls using adjacent studs for speaker and apparatus support.

2. Description of the Prior Art

In the home audio field, there has been an increasing demand for speakers which reproduce high quality sound. In most instances, sound reproduction quality directly correlates with speaker weight which directly correlates with the weight of the magnet contained in the speaker. That is, as speakers use heavier and heavier magnets, the quality of sound reproduction increases. For audiophiles, accurate reproduction of sound is the ultimate goal and therefore, speakers having heavier magnets are often employed. Additionally, the growth of the "home theater" market has lead to a boom in surround sound systems which consist of a number of speakers arranged about a room. Often, it is desired to place at least some of the speakers of such systems off of the floor in order to free up available floor space and avoid unnecessary sound absorption or interference. Accordingly, an increasing number of speakers are being mounted to walls or ceilings in existing homes. A problem attendant with mounting speakers to walls or ceilings is that the weight of the speaker may bow the wall or fall out of the wall or ceiling. This problem is compounding as home builders use increasingly thin wallboard materials and speaker manufacturers make speakers with increasingly heavy magnets. Additionally, wall and ceiling structures are subject to sound distortion, unwanted vibration, or vibration between the speaker, the mounting bracket used, and the wall or ceiling when the volume or frequency of the speakers reaches certain levels. Such vibrations may also lead to an eventual loosening of the bracket from the wall or ceiling.

Aesthetically speaking, many people do not want speaker boxes mounted on the surface of walls or ceilings, but would rather have them recessed in the walls or ceilings and they particularly desire such speakers to be substantially contained in the same continuous plane as the wall or ceiling. That is, it is generally not desired to have the speaker protruding from the wall or ceiling plane. Additionally, cutting holes in walls and ceilings and mounting speakers in these holes encounters problems in addition to those encountered when mounting the speakers to the walls and ceilings. Many of these problems are due to a lack of proper support for the speakers because the speakers are attached to drywall or, at the most, just one stud. U.S. Pat. No. 4,296,280 to Richie attempted to overcome some of these problems by constructing a speaker box of sufficient size to span the distance between adjacent wall studs which is typically 14 inches or larger. However, a problem with producing such large speaker boxes is that a correspondingly large hole must be cut into the walls or ceilings of existing homes if such a speaker is to accommodated. People wanting a plurality of speakers mounted in the walls then need to cut a large number of large holes in their walls to accommodate such speaker enclosures. Other patents such as U.S. Pat. No. 5,423,500 to Struthers et al. utilize a bracket having thin adjustable wing members which are attached to fronts of adjacent studs. It is desired to have these wing members as thin as possible in order to fit between the stud and the wallboard. The bracket is then attached to a speaker. Problems inherent with this design include wall bowing due to the presence of the wings between the wallboard and stud and difficulty of installation into existing walls (walls which are already covered by wallboard).

SUMMARY OF THE INVENTION

The present invention overcomes the above-described problems and provides a distinct advance in the art of in-wall speaker mounting apparatuses. More particularly, the present invention provides an in-wall speaker mounting apparatus that can support speakers having heavy magnets without bowing wall boards or dislodging the speaker from any supporting brackets. By attaching to adjacent studs in a wall, the present invention can support a very heavy speaker and such a weight is carried by the studs rather than by the wall in which the speaker is mounted. Additionally, the present invention is adapted to work in existing buildings as well as be built into new construction. The apparatus itself is removable and can be transferred to a new residence should the owner move.

The apparatus of the present invention broadly includes an open box-like structure having a plurality of fixture assemblies attached thereto as well as at least one access hole for speaker wire. Preferably, the access hole is provided with a grommet to seal and prevent wear or chaffing of the inserted speaker wire as well as the speaker apparatus. The open box-like structure is generally constructed of a backwall having four upstanding sidewalls attached thereto. The sidewalls are oriented such that each sidewall is opposed to another sidewall and perpendicular to the other two sidewalls. The fixture assemblies are positioned in and about a plurality of apertures such that for each desired fixture assembly, there is a corresponding aperture in one of the sidewalls. In order to provide stability and support to the apparatus when such is mounted in a wall, it is preferred to have two sidewalls which are opposed to each other and parallel to adjacent studs in the wall to be constructed with at least two apertures apiece and a corresponding fixture assembly for each aperture.

The fixture assembly preferably comprises an interiorly threaded spacer mount presenting a flanged portion, an interior portion and an exteriorly threaded region extending through the aperture and into the interior of the apparatus. The flanged portion of the spacer mount is provided with a rough texture or spikes which serve to anchor the spacer mount to the sidewall. It is also preferred that the sidewall be routed so as to accommodate and permit the flanged portion to be drawn flush with the sidewall. A hex nut having a threaded bore, a head, and an opposed flange is threadably mounted to the exteriorly threaded region of the spacer mount. In preferred embodiments, the exteriorly threaded region of the spacer mount is in a slightly recessed relationship with the hex nut head. A spacer, in the general shape of a threaded bolt and presenting a bore therethrough and a nut threaded thereon, is threadably mounted to the threaded interior portion of the spacer mount. Preferably, the nut is a locking nut. After extension and retraction of the spacer, the nut is threadably adjusted in order to lock, limit or prevent further rotation or counter-rotation of the spacer.

Installation of an apparatus in accordance with the present invention can be accomplished in new construction (prior to the wallboards being connected to the studs) or into existing walls. For existing walls, the studs are first located and a hole corresponding in size to the apparatus being mounted in the wall is cut out. Next, the apparatus is placed in the hole and the spacers are adjusted so that they contact the adjacent studs. Once at least one spacer on each of the opposing sides of the apparatus adjacent the studs contacts the studs, the spacers are further adjusted so that they exert an outward pressure on the studs sufficient to support the apparatus. As noted above, for increased stability and support, it is preferred that at least two spacers contact each stud. Once the spacers are properly positioned, the nut threaded onto the spacer is rotated and tightened such that it contacts the hex nut and prevents further rotation or adjustment of the spacer. A fastener is then inserted into the bore of the spacer and secured to the stud contacted by such spacer. Typically the fastener is a screw and is therefore screwed into the stud. The process is repeated for each of the fixture assemblies until the desired number of fixtures are secured to studs. Speaker wire is then threaded through the access hole in the backwall or a sidewall and connected to a crossover or speakers contained on a speaker plate. The speaker plate is then mounted to a plurality of mounting brackets attached to the sidewalls and a grill or cover can then be attached to the speaker plate. For new construction, similar steps are followed with the exception of cutting a hole in the wall prior to mounting the apparatus. However, it is understood that a hole corresponding in size to the apparatus will need to be cut into whatever wallboard is attached to the supporting studs.

By constructing an in-wall speaker mounting apparatus as described herein, numerous advantages are realized. For example, high quality speakers having extremely heavy magnets can be mounted in the wall so that the grill or speaker cover are flush with the wall and the weight of the apparatus and speaker is supported by the studs and not the wall, thereby preventing bowing and/or damage to the wall. Furthermore, damage and distortion due to vibrations is limited. The apparatus of the present invention provides a fixture assembly which is strong, yet does not apply unnecessary weight stress on the apparatus. This is accomplished by having the spacer mount interior portion positioned snugly in the aperture and the cooperative effect of the hex nut flange and the spacer mount flanged portion which permit weight distribution along the sidewall of the apparatus.

These and other important aspects of the present invention are described more fully in the detailed description below.

BRIEF DESCRIPTION OF THE DRAWINGS

FIG. 1 is a top plan view of a speaker apparatus unattached to wall studs in accordance with the present invention;

FIG. 2 is a top plan view of a speaker apparatus attached to adjacent wall studs in accordance with the present invention;

DETAILED DESCRIPTION OF THE PREFERRED EMBODIMENT

The following examples set forth preferred embodiments of the present invention. It is to be understood, however, that these embodiments are provided by way of illustration and nothing therein should be taken as a limitation upon the overall scope of the invention.

Figure 3:
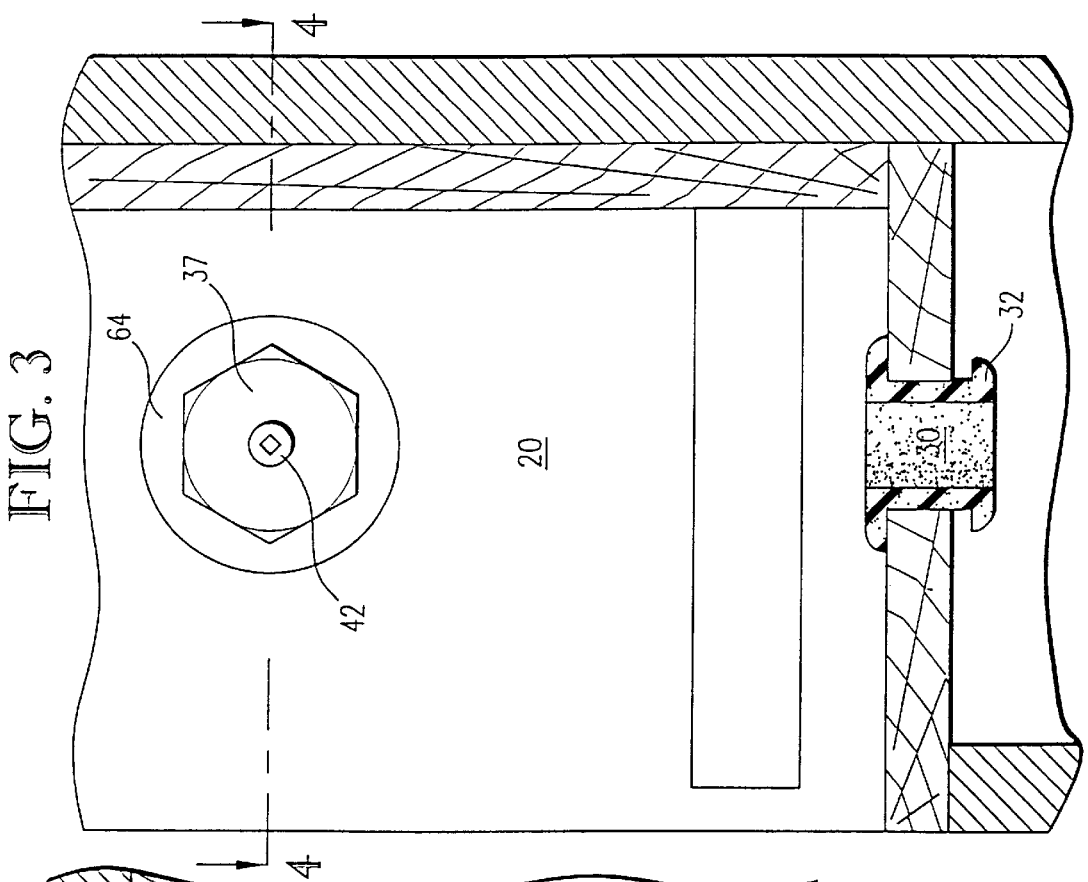
FIG. 3 is a cross-sectional side view taken through line 3—3 from FIG. 2.
Figure 4:
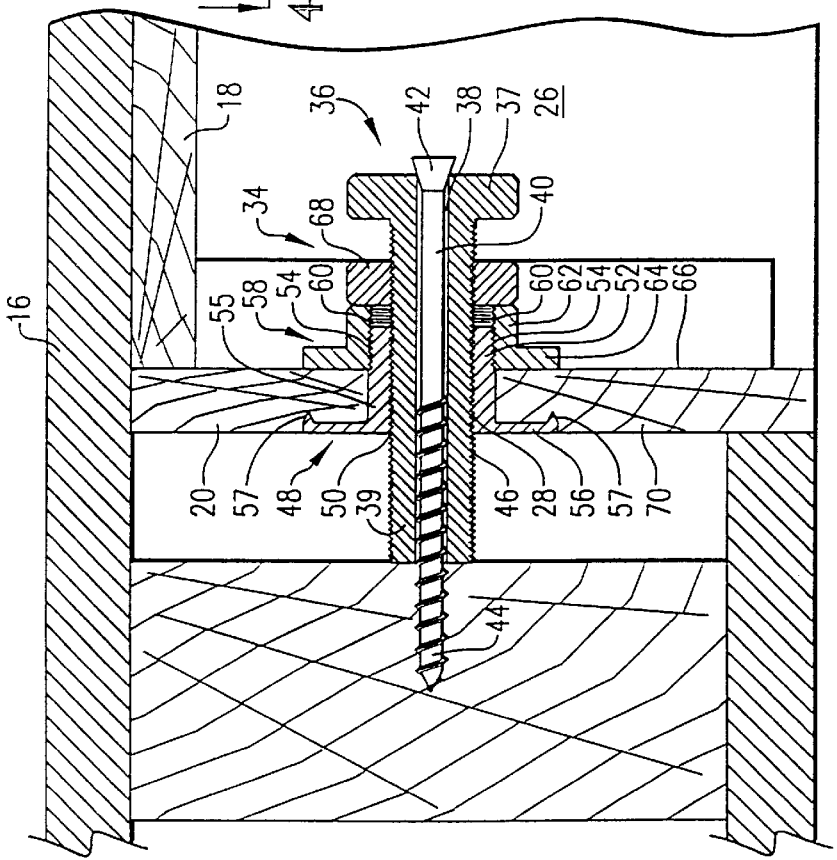
FIG. 4 is a cross-sectional side view taken through line 4—4 from FIG. 3.

Turning now to the drawing figures, and particularly to FIGS. 1 and 2, an in-wall speaker mounting apparatus (10) constructed in accordance with a preferred embodiment of the invention is illustrated. The apparatus (10) is operable for securing in-wall speakers to adjacent studs (12, 14) of a wall (16). Apparatus (10) includes backwall (18) and upstanding side walls (20, 22, 24, 26). As shown, the sidewalls (20, 22, 24, 26) are oriented such that sidewall (20) is opposed to sidewall (22) while sidewall (24) is opposed to sidewall (26). Thus, the overall shape of the apparatus (10) is in the shape of an open box. As shown in FIG. 4, the sidewalls (20, 22, 24, 26) have at least one aperture (28) therethrough. Preferably, there are a pair of apertures (28) on one sidewall (20) and another pair of apertures (28) on opposing sidewall (22). At least one of sidewalls (20, 22, 24, 26) has an access hole (30) therethrough which provides a channel through which speaker wires or the like may be inserted for entry into the apparatus (10) and for connection to speakers. A grommet (32) is positioned in access hole (30) to seal and reduce chaffing or stress on any wire inserted therethrough as well as to protect access hole (30) from similar stresses or plug it if not used.

Apparatus (10) further includes a fixture assembly (34) positioned in at least one of said apertures (28) and extendable therethrough into an extended position as shown in FIG. 2 and a retracted position as shown in FIG. 1. Fixture assembly (34), illustrated best in FIG. 4, includes elongate spacer (36) having a head (37) and an opposed distal end (39) and is operable to extend through aperture (28) and contact a stud (12, 14) in wall (16). Preferably, when at least one spacer (36) is in the extended position for each opposing sidewall (20, 22, & 24, 26) and contacting a stud (12, 14), there is sufficient pressure exerted on each of the studs (12, 14) by each spacer (36) to support the speaker mounting apparatus (10) without further attachment. It is also preferable that spacer (36) be hand-adjustable for quick and easy extension and retraction through aperture (28). Spacer (36) also includes bore (38) extending therethrough and fastener (40) positioned in bore (38). Fastener (40) presents head (42) and an opposed distal end (44). Preferably, distal end (44) is threaded in order to facilitate insertion into stud (12). Spacer (36) is provided with threading (46) on its exterior surface.

A spacer mount (48) is positioned in each aperture (28). Mount (48) includes a threaded bore (50) therethrough and further presents interior portion (52) presenting an exteriorly threaded region (54) which is oriented toward the interior of apparatus (10), contained portion (55) which is oriented within aperture (28), and flanged portion (56) which is oriented toward the exterior of apparatus (10) and generally flush with the plane of the sidewall (20, 22, 24, 26) into which spacer mount (48) is positioned. Preferably, at least one small spike (57) is included on flanged portion (56) and penetrates sidewall (20, 22, 24, 26) to add further stability and prevent rotation. Threaded bore (50) is adapted to threadably mate with spacer thread (46).

Assembly (34) further includes hex nut (58) having a threaded bore (60) therethrough and presenting hex nut head (62) and hex nut flange (64). Hex nut threaded bore (60) is adapted to receive spacer mount interior portion (52) and spacer (36) therethrough and mate with threaded region (54) while thread (46) of spacer (36) mates with spacer mount threaded bore (50) such that spacer (36) is threadably attached to spacer mount threaded bore (50). Hex nut head (62) provides a gripping surface for threadable rotation of hex nut (58) about threaded region (54) to a point at which hex nut flange (64) contacts the interior face (66) of sidewall (20, 22, 24, 26). Such rotation also draws flanged portion (56) including spike (57) into sidewall (20, 22, 24, 26) thereby providing a strengthened assembly (34) due to the flanges (56, 64) which are on opposing sides of sidewall (20, 22, 24, 26). Such a configuration of opposing flanges (56, 64) also increases the stability of apparatus (10) when mounted to studs (12, 14). Thus, hex nut flange (64) provides strength and stability to fixture assembly (34) when flange (64) is threadably mounted such that flange (64) is flush with face (66). Assembly (34) is further provided with a nut (68) threadably mounted to thread (46) of spacer (36) and is shiftable through threadable rotation between spacer head (37) and hex nut head (62), or spacer mount interior portion (52) when such are provided. Nut (68) is operable for stabilizing and securing spacer (36) when in the extended position and contacting stud (12) by preventing counter-rotation of spacer (36) and thereby losing contact between spacer (36) and stud (12).

In the embodiments depicted in FIGS. 1–4, mount (48) is first inserted into aperture (28), hex nut (58) is then threaded on to threaded region (54) until hex nut flange is flush with sidewall interior face (66). Next, spacer (36) having nut (68) threaded thereon is threadably mounted from sidewall interior face (66) toward sidewall exterior face (70) until stud (12) is contacted by spacer distal end (39). Thereupon, nut (68) is rotated about threads (46) until contacting spacer mount (48) and/or hex nut head (62) and is tightened to prevent further rotation of hex nut (58) about spacer mount exteriorly threaded region (54). In a preferred embodiment, nut (68) is rotated about threads (46) until contacting hex nut head (62) and not spacer mount (48) because spacer mount (48) is recessed with respect to hex nut head (62). Fastener (40) is then inserted into and advanced along bore (38) until the distal end (44) contacts stud (12) whereupon end (44) is screwed into or otherwise inserted in stud (12). This process is then repeated for each fixture assembly (34). In this manner, the speaker mounting apparatus (10) is supported by attachment to adjacent studs (12, 14) of a wall (16).

Finally, apparatus (10) includes a plurality of mounting brackets (72a, 72b, 72c, 72d) operable for mounting a speaker face plate (not shown) containing at least one speaker. Mounting brackets (72a, 72b, 72c, 72d) are positioned such that when a speaker face plate is mounted thereto, it will be flush with the wall (16) containing the apparatus (10). Any wire needing to be connected to the speakers contained on the speaker face plate can then be inserted into access hole (30) protected by grommet (32).

Apparatus (10) can be used to mount in-wall speakers in existing walls or as such walls are being built in new construction. To mount in-wall speakers in existing walls, a hole corresponding to the size of the apparatus (10) is cut into a wall (16) between adjacent studs (12, 14). Spacers (36) are then threadably rotated until they contact the nearest adjacent stud (12, 14). When spacers (36) on opposite sides of the apparatus (10) are extended and are contacting the studs (12, 14), a fastener (40) is inserted therethrough and screwed into the corresponding stud (12, 14). This process is repeated until the desired number of fasteners (40) are connected to adjacent studs (12, 14). A speaker plate containing speakers is then positioned near the hole in wall (16) while speaker wires are inserted through the access hole (30) and attached to the crossover or appropriate speakers on the speaker plate. The speaker plate is then attached to mounting brackets (72a, 72b, 72c, 72d) using conventional attachment devices. If a grill is to be placed over the speaker plate to protect the speakers from contact and the elements, such can be done at this time. The same steps, with the exception of cutting a hole in the wall, are also followed for mounting in-wall speakers during new construction. However, in order to insure that the speaker plate will be flush with the wall (16) the thickness of the wall material (e.g. drywall, sheetrock, etc.) as well as the thickness of the speaker plate and/or grill must be known and accounted for in adjusting the depth of the in-wall speaker apparatus (10).

Although the materials used to construct a speaker apparatus in accordance with the present invention can be any conventional material, one embodiment of the present invention comprises wooden sidewalls (20, 22, 24, 26) and a backwall (18) ⅜ inches thick (⅜"). The sidewalls (20, 22, 24, 26) are secured to the backwall (18) using conventional attachment methods and devices (e.g. glueing, nailing, stapling, etc) resulting in a box-like shape. Because commonly employed studs (12, 14) are about 3½ inches deep, the apparatus (10) is generally sized to fit within this depth and is therefore approximately 3½ inches deep. However, the apparatus (10) as well as the particular components used to construct the apparatus can be of any desired dimensions, thereby accommodating speakers of different shapes and sizes as well as building construction of different shapes and sizes. Components of fixture assembly (34) are preferably constructed of metal and have the following dimensions: flanged portion (56) has a diameter of approximately 1½ inches; spikes (57) on flanged portion (56) extend approximately 1/16 of an inch outwardly from portion 56; threaded bore (50) is adapted to receive a fixture (36) having a diameter of ½ inch; hex nut flange (64) has a diameter of approximately 1½ inches, thereby correlating with the diameter of flanged portion (56); fixture distal end (39) has a diameter of approximately ½ inch; nut is of sufficient size to threadably mount with threading (46) on fixture distal end (39); and, fastener (40) is typically a #10 screw. Head (42) can be any conventional fastener (36) head, however box head or screw heads adapted to fit any variety of drive types may be employed.

Although the invention has been described with reference to the preferred embodiment illustrated in the attached drawing figures, it is noted that equivalents may be employed and substitutions made herein without departing from the scope of the invention as recited in the claims. For example, differently proportioned components of the fixture assembly (34) or sidewalls (20, 22, 24, 26) of different dimensions could be employed.

Having thus described the preferred embodiment of the invention, what is claimed as new and desired to be protected by Letters Patent includes the following:

1. An in-wall mounting apparatus comprising:

an open face box having a backwall and a plurality of upstanding sidewalls, at least one of said sidewalls including an aperture therethrough;

a spacer extending through said aperture, said spacer presenting a substantially flat first end and an opposed second end and having a bore therethrough, said spacer being adjustable between an extended position and a retracted position and said spacer being of sufficient length to contact a stud in the wall with said first end when in said extended position;

a fastener positioned in said bore and adapted to secure said box to the stud;

an internally threaded spacer mount extending through said aperture and operable for threadable connection with said spacer; and a nut, said spacer mount presenting an exteriorly threaded region coupled with said nut.

2. The apparatus of claim 1 further comprising an adjustable nut threadably mounted on said spacer and operable for preventing rotation of said spacer within said spacer mount.

3. The apparatus of claim 1, said sidewalls including two pairs of opposing sidewalls.

4. The apparatus of claim 1, each of said sidewalls including at least one aperture therethrough.

5. The apparatus of claim 4, including a grommet positioned in at least one of said apertures.

6. The apparatus of claim 1, said backwall including an aperture therethrough.

7. A method of mounting the apparatus of claim 1 to wall studs comprising the steps of:

contacting said stud in the wall with said spacer;

inserting said fastener through each said spacer; and securing each said fastener to the stud.

8. The method of claim 7 further comprising: cutting a hole in a wallboard covering said stud, said hole corresponding in size to said appartus.

9. An in-wall mounting apparatus comprising:

an open face box having a backwall and a plurality of upstanding sidewalls, two of said sidewalls each including an aperture therethrough, said two sidewalls being oriented in opposing fashion;

two spacers, with each spacer extending through a different one of said apertures, each of said spacers having a bore therethrough and being adjustable between an extended position and a retracted position;

two fasteners, with one of the fasteners being positioned in each bore of each spacer and adapted to secure said box to a stud;

two internally threaded spacer mounts, with each spacer mount extending through a different one of said apertures and operable for threadable connection with one of said spacers; and two nuts, wherein each of said spacer mounts presents an exteriorly threaded region coupled with one of said nuts.

10. The apparatus of claim 9, further comprising an aperture through another of said sidewalls, said aperture including a grommet therein.

11. The apparatus of claim 9, said spacer mounts each presenting a threaded internal bore.

12. The apparatus of claim 11, each of said spacers being cooperatively threaded with said threaded internal bore of each spacer mount.

13. The apparatus of claim 12, each of said nuts comprising a flange nut, with each flanged nut presenting a flanged portion and being mounted on a different one of said spacer mounts.

14. The apparatus of claim 11, further comprising two rotatable nuts, with each rotatable nut being positioned on a different one of said spacers.

15. The apparatus of claim 9, each of said spacers being threaded such that said spacer can be extended and retracted through said aperture by rotation about said threads.

16. An in-wall mounting apparatus for mounting an audio speaker, the in-wall mounting apparatus comprising:

a sidewall having an aperture;

a spacer extending through the aperture, with the spacer presenting a first end and an opposed second end and having a bore therethrough, the spacer being adjustable between an extended position and a retracted position and the spacer being of sufficient length to contact a stud in the wall with the first end when in the extended position;

a fastener positioned in the bore and adapted to secure the sidewall to the stud;

an internally-threaded spacer mount extending through the aperture and operable for threadable connection with the spacer; and a nut, wherein the spacer mount presents an exteriorly-threaded region for coupling with the nut.

* * * * *